United States Patent
Edelman et al.

[11] 3,817,595
[45] June 18, 1974

[54] EXTENSIBLE-RETRACTABLE HELICALLY COILED FIBER OPTIC ASSEMBLY

[75] Inventors: Alfred E. Edelman, Camden, N.J.; Lionel J. LaPlante, South Bridge, Mass.

[73] Assignee: Vicon Products Corp., Mamaroneck, N.Y.

[22] Filed: May 15, 1972

[21] Appl. No.: 253,644

Related U.S. Application Data

[62] Division of Ser. No. 35,149, May 6, 1970, abandoned.

[52] U.S. Cl. .............. 350/96 B, 65/4, 65/DIG. 7, 156/91, 156/173, 156/180, 156/196, 156/289, 156/290, 156/294, 156/296
[51] Int. Cl. .................................................. G02b 5/16
[58] Field of Search ........... 156/91, 173, 196, 289, 156/290, 291, 293, 294, 296; 264/230; 174/69; 65/4, DIG. 7; 350/96 B

[56] References Cited
UNITED STATES PATENTS

| | | | |
|---|---|---|---|
| 2,039,475 | 5/1936 | Campbell | 174/69 |
| 2,992,516 | 7/1961 | Norton | 156/296 |
| 3,010,357 | 11/1961 | Hirschowitz | 350/96 B |
| 3,016,785 | 1/1962 | Kapany | 65/4 |
| 3,050,907 | 8/1962 | Hicks, Jr. et al. | 350/96 B |
| 3,089,484 | 5/1963 | Hett | 350/96 B |
| 3,104,191 | 9/1963 | Hicks, Jr. et al. | 350/96 B |
| 3,169,305 | 2/1965 | Gray | 350/96 B |
| 3,318,994 | 5/1967 | Perrone et al. | 174/69 |
| 3,586,562 | 6/1971 | Jones | 65/4 |

*Primary Examiner*—Daniel J. Fritsch
*Attorney, Agent, or Firm*—Lerner, David, Littenberg & Samuel

[57] ABSTRACT

An extensible-retractable helically coiled fiber optic assembly, similar on configuration to the well known helically coiled telephone wire connecting telephone hand-sets to telephone equipment, is provided. A method of making the extensible-retractable coiled fiber optic assembly is taught in which individual glass fibers drawn down to a maximum diameter of 0.001 inches, and preferably down to 0.0008 inches or less, are clamped at their extremities to form a fiber optic bundle. The fiber optic bundle is disposed in a sheath of elastic material having a plastic memory, such as rubber, polyvinyl chloride, etc. This assembly is then wound about a mandrel and held in the coiled position during heat treatment to cure or set the sheathing material in the helical shape. The entire assembly is then cooled at a rate which will maintain the set and will not deleteriously affect the optical fibers.

11 Claims, 3 Drawing Figures

PATENTED JUN 18 1974 3,817,595
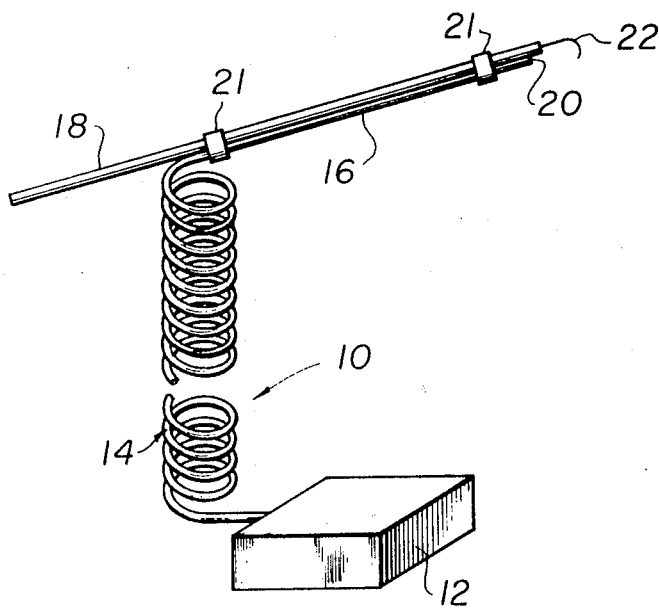
FIG. 1
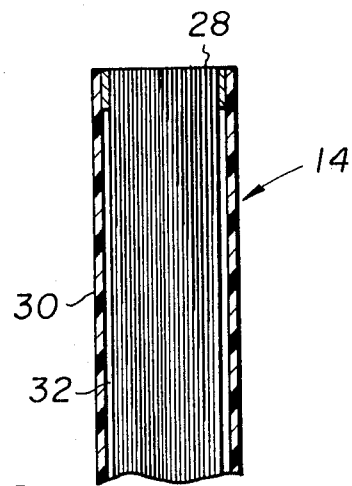
FIG. 2
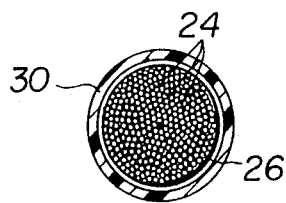
FIG. 3
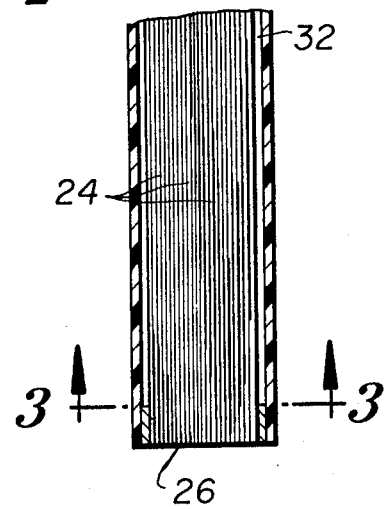
INVENTORS:
LIONEL J. La PLANTE
BY ALFRED E. EDELMAN
LERNER, DAVID & LITTENBERG
ATTORNEYS

EXTENSIBLE-RETRACTABLE HELICALLY COILED FIBER OPTIC ASSEMBLY

This is a division of application Ser. No. 35,149, filed May 6, 1970, now abandoned.

BACKGROUND OF THE INVENTION

Fiber optic bundles comprising a plurality of separate optical fibers are well known and are in wide spread use. See, for example, U.S. Pat. No. 3,050,907 granted Aug. 28, 1962 to J. W. Hicks, Jr. et. al.

Of the many applications found for such fiber optic bundles, most involve situations in which the fiber optic bundle is used to bring light from a remote light source to a relatively inaccessible area and/or to provide viewing of such area. These applications often involve the movement of instruments to which the fiber optic bundle is attached at one end.

One relatively new area of application is that of providing a light source connected by means of a fiber optic bundle to a dental instrument for providing light in the patient's mouth directly where the dental instrument is to be utilized. The use of any kind of medical instrument of course involves quite a bit of manipulation and movement which must be accommodated by the fiber optic bundle, and this is especially true of a dental instrument. To date, this has generally required long lengths of fiber optic bundles which have caused problems in storage and in the handling of dental instruments employing such fiber optic bundles to avoid entanglements therewith. One suggested means of overcoming such problems is that of providing a retractable fiber optic cord assembly. Such assemblies are relatively expensive, require substantial additional space in relation to the size of the light source assembly itself, and often involve the provision of moving parts with the disadvantages attendant the use of such moving parts. Further, retractable cord assemblies, such as weighted cord assemblies, etc., often present problems in failing to fully retract, sticking, etc.

It is the general object of this invention to provide an extensible-retractable helically coiled fiber optic assembly which overcomes the above-mentioned disadvantages of present devices. It is a further object of this invention to provide a method for producing helically coiled fiber optic assemblies which are extensible and retractable and will have a long, useful life.

Extensible-retractable helically coiled cord assemblies are quite well known, as evidenced by the helically coiled telephone wire connected to most telephone hand-sets, and as further evidenced by U.S. Pat. No. 2,039,475 granted May 5, 1936 to J. W. Campbell, and U.S. Pat. No. 3,318,994 granted May 9, 1967 to P. J. Perrone et al. However, this type of extensible-retractable cord assembly has not been used or suggested for use in the development of fiber optic bundle assemblies until the present invention due to the problems involved, and the fact that such assemblies were not considered feasible, if seriously considered at all.

SUMMARY OF THE INVENTION

According to the invention, there is provided an extensible-retractable optical fiber assembly comprising a sheath of elastic material which has been set while in a helical shape, and a plurality of flexible optical fibers disposed within said sheath of elastic material, said flexible optical fibers being sufficiently flexible to permit the optical fiber assembly to be extended and thereafter closed by the forces created in said sheath of elastic material tending to return it to its helical shape without deleteriously affecting the optical characteristics of the optical fibers.

There is further provided according to the invention, a method of making an extensible-retractable helically coiled fiber optic assembly, comprising the steps of disposing a plurality of flexible optical fibers within a sheath of elastic material, forming the assembled sheath and optical fibers into a helical shape, and setting the elastic material while it is maintained in said helical shape.

BRIEF DESCRIPTION OF THE DRAWINGS

FIG. 1 is a perspective view of a fiber optic illumination system for dentistry employing an optical fiber assembly in accordance with the present invention;

FIG. 2 is a cross-sectional view of a fiber optic assembly in accordance with the present invention; and FIG. 3 is a cross-sectional view of the fiber optic assembly of FIG. 2 taken along the lines 3—3 of FIG. 2.

DETAILED DESCRIPTION OF THE DRAWINGS

It will be appreciated that the present invention is capable of wide application in that coiled extensible-retractable fiber optic bundles may have many useful applications. The following description is, however, directed to a presently preferred embodiment of the invention in which it is employed for use in a fiber optical illumination system for dentistry, such description being made only by way of example and not intended as a limitation in any respect.

Referring now to the drawings in which like reference numerals refer to like parts throughout the various views, there is shown in FIG. 1 a fiber optic illumination system for dentistry 10 comprising suitable light source means 12, an extensible-retractable helically coiled fiber optic bundle 14 in accordance with the present invention, and an attachment light-projecting member 16 which receives one end of the fiber optic bundle 14. The attachment light-projecting member 16 is attached to a dental pick 18 by clips 21. The dental pick could, in the alternative, be specially made with a slot adapted to receive the attachment member 16.

Light from the light source means 12, illustrated as a modular box-like unit which may have a light bulb or similar light producing element therein (not shown), is conducted by the fiber optic bundle 14 to the tip or end 20 of the attachment member 16 to provide light adjacent the pick element 22 of the dental pick 18. The coiled fiber optic bundle 14 terminates in a straight portion disposed within the attachment member 16 which generally comprises an elongated metal tube.

The fiber optic bundle 14 is shown in approximately its fully retracted position in FIG. 1 in which the bundle 14 is relatively tightly coiled. The bundle 14 would normally be in this shape when the instrument is positioned on or near the light source means 12. In this regard, suitable instrument or attachment member holding means (not shown) may be mounted on the light source means 12. When the instrument is moved away from the light source means 12, the helical coil is extended or stretched opening the coils, similar to the effects one sees when moving a telephone hand-set away from its cradle. Upon return of the dental pick 18 towards the light source 12, the coils close taking up what would otherwise be slack in a straight cord. Generally, coiled fiber optic bundles made in accordance with the present invention have been produced with a 2 to 1:1 ratio, in that, for example, a bundle which measures approximately 4 feet when fully extended will measure approximately 2 feet when fully retracted.

As can be seen in FIGS. 2 and 3, the fiber optic bundle assembly 14 comprises a plurality of optical fibers 24, which consist of glass fiber optical elements in the illustrated embodiment. The term "optical fiber" as used herein is intended to include all light-conducting elements which are relatively long and small in cross-sectional area regardless of their cross-sectional configurations.

The optical fibers 24 are held together at each end by stainless steel annular clamp members 26 and 28. The clamp members are affixed, as for example by suitable adhesive (not shown), such as epoxy, to the inner surface of a sheath 30 of elastic material. The elastic material is of the type which has a "plastic memory" in that it will tend to return to a shape it has been set in, such as rubber, polyvinyl chloride, polyethylene, etc. The optical fibers 24, except for the restriction in their movement effected by clamp members 26 and 28, are free to move relative to each other and to the elastic sheath 30 as indicated by the gap 32 between the optical fibers 24 and the inner wall of the sheath 30.

The method of the invention generally comprises initially forming a bundle of flexible fiber optical elements 24. The term "flexible" is employed in the sense that the fiber optical elements can be coiled in a helical shape and thereafter extended and recoiled numerous times without breaking or having any adverse affect on their optical characteristics. It has been found in accordance with the present invention that glass fiber optical elements must be drawn down to a maximum diameter of 0.001 inches to provide the desired flexibility. It has further been found that it is preferable that the glass fiber optical elements be drawn down to a diameter of 0.008 inches or less. In the presently preferred embodiment of the invention, the bundle of flexible fiber optical elements are held together at their ends by the stainless steel clamp members 26 and 28.

The bundle of flexible fiber optical elements may be formed by bunching a number of individual glass fiber optical elements 24 together to form an integral bundle. This may be effected by initially saturating the glass fiber optical elements 24 with alcohol to break their surface tension and hold the fiber elements 24 together to form the integral bundle. The clamp members 26 and 28 are then slid over the ends of the integral bundle. Next, epoxy is applied to the portions of the fiber optical elements 24 within the ends of the clamp members 26 and 28 which will form the ends of the fiber optic bundle 14. The ends of the fiber optical elements 24 are then cut and polished to provide the desired light-conducting and optical characteristics.

The assembled fiber optical elements and clamp members 26 and 28 are then slid into an elastic sheath 30. An adhesive (not shown) is injected between the clamp members 26 and 28 and the inner wall of the sheath 30 to affix the clamp members 26 and 28 to the sheath 30. The fiber optic bundle 14 is now fully formed and is at the stage shown in FIG. 2.

A suitable lubricant or the like is used in accordance with the preferred method of the present invention to prevent the optical fibers 24 from sticking to the sheath 30, or becoming embedded therein, during the heat treatment to be described hereinafter. For example, silicone oil (not shown) can be injected through the wall of the sheath 30 after the fiber optic bundle 14 has been formed. The fiber optic bundle 14 is then left alone for a sufficient time to insure that the silicone oil has coated all of the optical fibers 24 due to capillary action.

The fiber optic bundle 14 is thereafter coiled about a mandrel (not shown) into a tight helical coil. The sheathing material is then set while held in the tight helical shape. The term "set" as referred to herein is intended to include any means of causing elastic material to assume a desired shape and have the tendency to return to that shape when stretched. For example, the term may include setting, vulcanizing, curing, irradiation, etc. After the sheathing material has been set, the coiled fiber optic assembly is removed from the mandrel and is ready for use.

When a particularly tight coil is desired, the finished coiled fiber optic bundle as made in accordance with the previous description may be placed on a smaller mandrel and wound down to a tighter helically shape. The material is then again set to provide the desired tighter coil.

The method of this invention may be carried out without using silicone fluid, or similar means for preventing the optical fiber elements from sticking together or to the sheath. However, to do so, the temperature must be very closely controlled. Particularly, the upper limit of the temperature must be closely controlled to reach the softening point of the sheathing material in order to reorient its molecular structure and set it and yet be low enough to prevent the optical fibers from becoming embedded in the sheathing or sticking together. If embedding or sticking does occur, the optical fibers will be fixedly attached to the sheath upon setting of the sheath material and/or to each other and will break upon extension of the fiber optical bundle assembly.

EXAMPLE 1

A 6 foot sheath of rubber having an outside diameter of 0.156 inches and an inside diameter of 0.100 inches was provided. A bundle of about 3,600 glass optical fibers having stainless steel clamp members approximately 1 inch in length was inserted in the sheath. The stainless steel clamp members had an outside diameter of about 0.095 inches and an inside diameter of about 0.071 inches. Silicone oil was injected into the sheath to prevent sticking of the glass optical fibers to one another or to the sheath. The stainless steel clamp members were adhesively bonded with epoxy to the sheath. The entire assembly was then coiled on a mandrel having an outer diameter of 3/8ths of an inch. The coiled assembly was held in place by asbestos tape while the ends of the sheath where the clamp members were disposed were covered with aluminum foil to keep heat from the clamp members to thereby prevent a detrimental effect on their holding power, such as may be caused by deterioration of the epoxy bonding material.

The assembly was placed in an oven which was brought up to a temperature of approximately 200° C. and maintained at that temperature for approximately 20 minutes. The assembly was then permitted to cool, which took about 15 to 20 minutes. In this regard, the cooling must be effected at a rate which permits the set to be maintained and yet does not have deleterious effects on the desired optical characteristics of the optical fiber elements. It will be appreciated that if the cooling is effected too quickly, the optical fibers may break. If the cooling is effected too slowly, the desired permanent set will not be obtained.

The coil upon cooling measured about three feet and the coils sprang back slightly so that a final inner diameter of about ½ inch was obtained. As noted previously, if a smaller diameter coil is desired, it has been found that the coiled fiber optic assembly can be more tightly coiled on a smaller mandrel and the sheathing material again set to provide the desired tighter coil.

EXAMPLE II

A fiber optic bundle similar to the one employed in Example I but only 4 feet in length was disposed within a sheath of polyvinyl chloride. Silicone oil was again used. In fact, it appears to be essential to use silicone oil or a similar agent when utilizing a synthetic plastic material to form the sheath. The coiled assembly was placed in an oven which was raised to a temperature of 200° C. and held at this temperature for about 10 minutes. The coiled assembly was again permitted to cool at a rate which maintained the set and did not deleteriously affect the optical fibers. The slight spring back was again noticed in that, whereas the mandrel had an outside diameter of 3/8ths of an inch, the final inside diameter of the coils was about ½ inch. The overall length of the coiled fiber optic bundle was approximately 2 feet or ½ the fully extensible length.

Though the invention has been described in connection with specific embodiments thereof, it will be appreciated that the description has been by way of example only and not intended as a limitation to the broad inventive concepts disclosed, and as particularly set forth in the appended claims.

What is claimed is:

1. A method of making an extensible-retractable helically coiled fiber optic assembly, comprising the steps of disposing a bundle of a plurality of flexible optical fibers within a sheath of elastic material having an inner diameter greater than the outer diameter of said bundle of flexible optical fibers so that said plurality of fibers are free to move relative to said sheath, forming the assembled sheath and optical fibers into a helical shape, heating the assembled sheath and optical fibers to a temperature sufficient to set the elastic material and thereafter cooling the elastic sheath and optical fibers at a rate such that the elastic material is set and the optical fibers remain free to move relative to each other and to the elastic sheath, and further including the step of treating said optical fibers anytime prior to the setting of the elastic material to prevent said fibers from sticking together or to the sheath upon heating thereof.

2. A method according to claim 1, wherein the step of disposing said plurality of optical fibers within said sheath of elastic material comprises drawing glass optical fibers down to a diameter equal to or less than 0.001 inches, and forming a bundle of said glass optical fibers.

3. A method according to claim 2, wherein said step of forming a bundle of said glass optical fibers comprises clamping the ends of a plurality of said glass optical fibers together with suitable clamping means, and the step of disposing the plurality of optical fibers within said sheath of elastic material further includes disposing the assembled bundle of glass optical fibers and clamping members within said sheath and affixing the clamping members to the inner wall of the sheath with the portions of the glass optical fibers disposed between said clamping members free to move within said sheath.

4. A method according to claim 2, wherein the step of drawing the glass optical fibers comprises drawing them down to a diameter equal to 0.0008 inches or less.

5. A method according to claim 4, wherein said step of forming a bundle of said glass optical fibers comprises clamping the ends of a plurality of said glass optical fibers together with suitable clamping means, and the step of disposing the plurality of optical fibers within said sheath of elastic material further includes disposing the assembled bundle of glass optical fibers and clamping members within said sheath and affixing the clamping members to the inner wall of the sheath with the portions of the glass optical fibers disposed between said clamping members free to move within said sheath.

6. A method according to claim 1, wherein said treating step comprises coating the optical fibers with silicone oil.

7. A method according to claim 6, wherein the elastic material is polyvinyl chloride and the step of setting the elastic material comprises bringing it to a temperature of approximately 200° C. and maintaining it at that temperature for approximately 10 minutes.

8. A method according to claim 6, wherein the elastic material is rubber and the setting step comprises heating the elastic material to a temperature of approximately 200° C. and maintaining it at that temperature for approximately 20 minutes.

9. A method according to claim 1, further comprising forming the assembled sheath and optical fibers in a tighter helical coil after the cooling step has been completed, again heating the sheathing material to set it, and again permitting it to cool at a rate sufficient to maintain the new set whereby a tighter helical coil is obtained.

10. An extensible-retractable helically coiled fiber optic assembly produced by the method of claim 1.

11. A method of making an extensible-retractable helically coiled fiber optic assembly, comprising the steps of disposing a bundle of a plurality of flexible optical fibers within a sheath of elastic material having an inner diameter greater than the outer diameter of said bundle of flexible optical fibers so that said plurality of fibers are free to move relative to said sheath, forming the assembled sheath and optical fibers into a helical shape, heating the assembled sheath and optical fibers to a temperature sufficient to set the elastic material and thereafter cooling the elastic sheath and optical fibers at a rate such that the elastic material is set and the optical fibers remain free to move relative to each other and to the elastic sheath, forming the assembled sheath and optical fibers in a tighter helical coil after the cooling step has been completed, again heating the sheathing material to set it, and again permitting it to cool at a rate such that the elastic material is set and the optical fibers remain free to move relative to each other and to the elastic sheath, whereby a tighter helical coil is obtained.

* * * * *